(12) United States Patent
Döhmen et al.

(10) Patent No.: US 6,416,313 B1
(45) Date of Patent: Jul. 9, 2002

(54) BLOW MOLDING MACHINE FOR LOW-WASTE BLOW MOLDING

(75) Inventors: Willi Döhmen, Mönchengladbach; Frank Schüller, Frechen; Dirk Wehrens, St. Augustin, all of (DE)

(73) Assignee: Fischer-W. Müller Blasformtechnik GmbH, Troisdorf (DE)

(*) Notice: Subject to any disclaimer, the term of this patent is extended or adjusted under 35 U.S.C. 154(b) by 0 days.

(21) Appl. No.: 09/448,063

(22) Filed: Nov. 23, 1999

(30) Foreign Application Priority Data

May 18, 1999 (DE) .......................... 199 22 684

(51) Int. Cl.[7] ............................................. B29C 49/30
(52) U.S. Cl. .................... 425/528; 264/540; 425/451; 425/532; 425/541
(58) Field of Search .................... 425/451, 532, 425/541, 528; 264/540

(56) References Cited

U.S. PATENT DOCUMENTS

| | | | | |
|---|---|---|---|---|
| 2,692,407 A | * | 10/1954 | Stacy | 425/451 |
| 4,239,474 A | * | 12/1980 | Nakagawa | 425/532 |
| 4,594,067 A | * | 6/1986 | Langos | 425/451.9 |
| 5,030,083 A | * | 7/1991 | Kohno et al. | 425/532 |
| 5,037,289 A | * | 8/1991 | Ohta et al. | 425/532 |
| 5,178,817 A | * | 1/1993 | Yamada et al. | 425/528 |
| 5,288,224 A | * | 2/1994 | Yamamura et al. | 425/532 |

FOREIGN PATENT DOCUMENTS

| | | | | |
|---|---|---|---|---|
| JP | 55-21240 A | * | 2/1980 | 264/540 |
| JP | 55-73527 A | * | 6/1980 | 264/540 |
| JP | 3-261534 A | * | 11/1991 | 264/540 |

* cited by examiner

*Primary Examiner*—Robert Davis
(74) *Attorney, Agent, or Firm*—Sidley Austin Brown & Wood, LLP

(57) ABSTRACT

A blow molding machine for producing three-dimensional low-waste articles including at least one horizontally separated blow mold formed of upper and lower half-molds, a device for vertically displacing at least one of the upper and lower half-molds between an open mold position in which the upper half-mold is spaced from the lower half-mold, and a closed mold position in which the upper and lower half-molds engage each other, a device for locking the upper and lower half-molds in the closed position, and a device for pivoting the upper half-mold in the open mold position about a horizontal axis by substantially 90° and/or displacing the upper half mold in a horizontal plane.

6 Claims, 2 Drawing Sheets

BLOW MOLDING MACHINE FOR LOW-WASTE BLOW MOLDING

BACKGROUND OF THE INVENTION

1. Field of the Invention

The present invention relates to a blow molding machine including an extrusion or co-extrusion head for forming a preform hose which is associated with an extruder, a hose handling device, a device for removing finished articles, at least one horizontally separated blow mold formed of upper and lower half-molds, a device for vertically displacing at least one of the upper and lower half-molds between an open mold position in which the upper half-mold is spaced from the lower half-mold, and a closed mold position in which the upper and lower half-molds engage each other, and a device for locking the upper and lower half-molds in the mold closed position.

2. Description of the Prior Art

The manufacture of low-waste, seamless, three-dimensional blown article is a well known technology since long ago. The machines, which are used to this end, include, as a rule, a handling device formed as a gripper, if necessary, a field programmable six-axes robot for placing preforms into a cavity formed in a blow mold. The production of seamless blown articles or parts results from the fact that upon closing of the mold, portions of the circumference of the preform, i.e., the extruded hose are not squeezed out, but rather the entire circumference of the preform is surrounded by the mold cavity. Nevertheless, both ends need be closed by squeezing to enable the blowing up of the preform by injecting gas through a needle or a mandrel.

German Publication DE-Z, Plastvezarbeiter (Plastic Processor), 44, 1993, No. 12, p.p. 44–49 (DE-Z) discloses the use of conventional blow molding machines such, e.g., as disclosed in German Patent Publication DE 195 19 094 A1, in a completely automatic process by providing a mechanical gripper which lifts a hose-like preform, which is formed with a shape corresponding to the shape of the mold cavity, from a hose-producing nozzle and places it into the mold cavity. As a rule, the free-programmable, six-axes robot places the preform into the mold completely automatically, with the mold being then closed with a vertical closing device.

DE-Z further discloses that slides can be provided in a mold for manipulating a preform placed into the mold. The above-described slides are used primarily for blown articles with small curvatures. The slides are displaced in the separation plane of the mold and prevent squeezing-out of the preform upon closing of the mold. After closing of the mold, the slides are withdrawn, and the preform is blown up.

However, with the use of the conventional blow molding machines, placing of a preform in a cavity with very small radii is very difficult or at all impossible because the preform, in this case, has a tendency to jump out at the curve. Further, because of an early contact of the hose with the surface of the cavity of the lower half-mold, cooling of the preform occurs which adversely affects the subsequent process. Finally, the closing system which is used with the known blow molding machines and which is based on using of spars, is very expensive. Furthermore, the conventional closing devices are not well suited for use with multi-station blow molding machines.

Accordingly, an object of the present invention is to provide a blow molding machine for producing low-waste, three-dimensional articles of the above-described type having improved and more varied operational characteristics and which at the same time would insure a more economical production of the articles.

SUMMARY OF THE INVENTION

This and other objects of the present invention, which will become apparent hereinafter, are achieved by providing a blow molding machine that includes means which in the open position of the mold, i.e., when the upper half-mold is spaced from the lower mold, pivots the upper half-mold about a horizontal axis by approximately 90° and/or displaces the upper half-mold in a horizontal plane substantially linearly. The inventive blow molding machine for producing of low-waste, three dimensional articles permitted to use per se known locking systems, the use of which in the conventional blow molding machine was not considered previously, to insure the application of necessary locking and retaining forces. Further, the use of the know locking system permitted to eliminate the need in expensive closing devices for closing the molds and which were used with conventional blow molding machines. Thus, the present invention provides for linear displacement of the upper half-mold in a vertical plane between the mold closed and open positions, and for pivoting of the upper half-mold about a horizontal axis and/or for linear displacement of the upper half-mold in a horizontal plane in the open position of the mold.

The upper half-mold, by being pivoted, according to the present invention, in its lifted position about a horizontal axis by approximately 90°, becomes easily accessible to a robot without additional large expenses. This significantly simplifies placing of the preforms. Besides, a significant time saving is insured because the upper half-mold is in the same position as the preform-placing robot which, after the upper half-mold having been pivoted, has sufficient free space for manipulations. After the placement of the preform, the upper half-mold need only be pivoted back and lowered onto the lower half-mold. In contrast, with the conventional concept, time-consuming manipulations of the lower half-mold are needed for placing a preform hose which is extruded at a stationary point.

In case the upper half-mold is additionally displaced in a horizontal plane, in a simple manner, the operation of a multi-station system can be effected based on a principle of a so-called wheel machine, with more than two molds being associated with the same extrusion unit, which is particularly advantageous for a sequential extrusion or co-extrusion. An upper half-mold which, in this case, is displaced along two linear axes, enables an operation at which the lifted upper half-mold, after removal of a finished article and after or before it is moved to the following station, is pivoted by 90° in a vertical plane, enabling placement of so-called placing parts, e.g., clips, ets. by a robot, a feeding system, or operator.

According to a further development of the present invention, there is provided a carriage in which the upper half-mold is received and which is displaced horizontally. The carriage is equipped with a lifting device for lifting and lowering the upper half-mold from and toward the lower half-mold at the blow station. At that, the mold separation lines can deviate from a substantially horizontal jointing plane because the upper half-mold during the locking process can be displaced by another device.

According to the present invention, a pivoting device is provided for pivoting the upper half-mold in the vertical plane. Such a device can be formed, e.g., as a conventional motor-driven rotary drive.

According to the present invention, the locking device includes locking cylinders and mating lock bars provided on respective backing plates of the lower and upper half-molds. This locking device is particulary advantageous when more than one upper half-molds are associated with a single lower half-mold mold because it is only the lower half-mold which is provided with high-quality and, therefore, expensive locking cylinders.

When oppositely arranged slides are provided in each region of the cavity of the lower half-mold with a narrow radius and which, upon placement of a preform hose close, if necessary, gradually, the preform hose does not jump out of the cavity even when the cavity has one or more narrow radii. The upper half-mold, which in this case represents a so-called pot cover for the lower half-mold, is provided with a recess for formlockingly receiving at least one pair of slides. The drive elements for driving the slides and associated control elements do not form part of the blow mold. Rather, they are provided in the portion of the machine frame in which the lower half-mold is received. Because it is not the slides and their drives apply the closing force but a special locking system, the slides and their drives are inexpensive.

According to the present invention, a tempered air is injected into the cavity of the lower half-mold. Thereby, no impermissible cooling of the preform hose takes place, and no walls with increased thickness are formed during the blow-up process.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
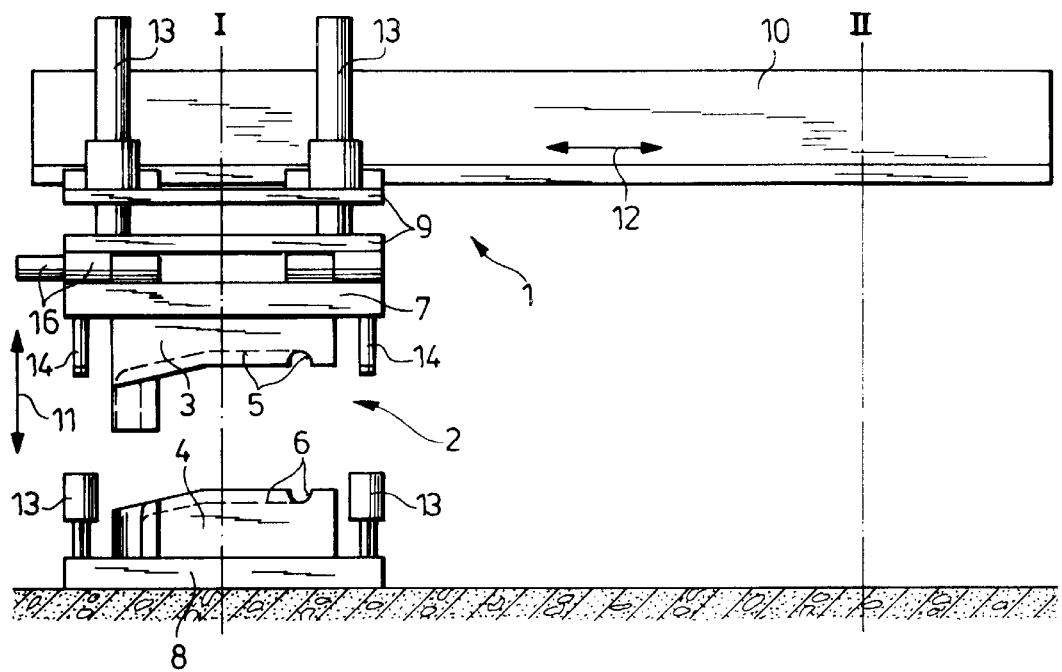
FIG. 1 a schematic view of a blow molding machine with a mold unit according to the present invention with the half-molds in a spaced operational position thereof.

FIG. 1 of the drawings shows substantially a mold 2 of a conventional blow molding machine including an extrusion or co-extrusion head for forming a preform hose which is associated with an extruder, a hose handling device and a device for removing finished articles all of which are not shown for simplicity sake. The mold 2 consists of an upper half-mold 3 and a lower half-mold 4. The lower half-mold 4 can be either stationary, as shown in FIG. 1, or alternatively, serve as an ejector half-mold. Both half-molds 3 and 4 have respective cavities 5 and 6 in a closed position of which, a preform hose is placed into the cavity 6 of the lower half-mold 4 for being blow-molded into a finished article. The preform hose is placed into the cavity 6 of the lower form 4 by a handling device of a robot that takes the preform hose off the extrusion or co-extrusion head. Both the upper and lower half-molds 3 and 4 are supported on respective backing plates 7 and 8.

The upper half-mold 4 is arranged in a carriage 9 which is linearly displaceable along a supporting frame 10 from a blow station I to a handling station II by a drive (not shown) connected with the carriage 9. The upper half-mold 3 is displaceable thereby in vertical and horizontal directions 11 and 12. The carriage 9 is provided with a lifting device 3 which consists of two cylinders 13. In the simplest case, the upper half-mold 3 is displaced in the vertical direction 11 by the lifting device 13 between the closed position of the half-molds 3, 4 and their open position in which a finished article can be removed from the mold 2. When in the open position, the upper half-mold 3 is pivoted by 90 in a vertical plane, a handling robot (not shown) can place a new preform hose into the lower half-mold 4. For pivoting the upper half-mold in the vertical plane, a pivoting device 16 is provided.

To provide for application of closing or retaining forces in the closed position of the half-molds 3 and 4, a locking system is used. Thereby, a locking unit based on using spars can be eliminated. For locking the mold 2, locking cylinders 13 are provided on the lower backing plate 8, and stationary mating lock bars 14 are provided on the upper backing plate 7. Upon movement of the half-molds 3 and 4 toward each other into their closed position, the lock bars 14 become engaged in the locking cylinders 13 which provide the necessary locking force. In the open position of the mold 2, with the upper half-mold 3 being pivoted in the vertical plane, access to the lower half-mold 4 for placing a preform hose therein manually or with a robot is insured.

Figure 2:
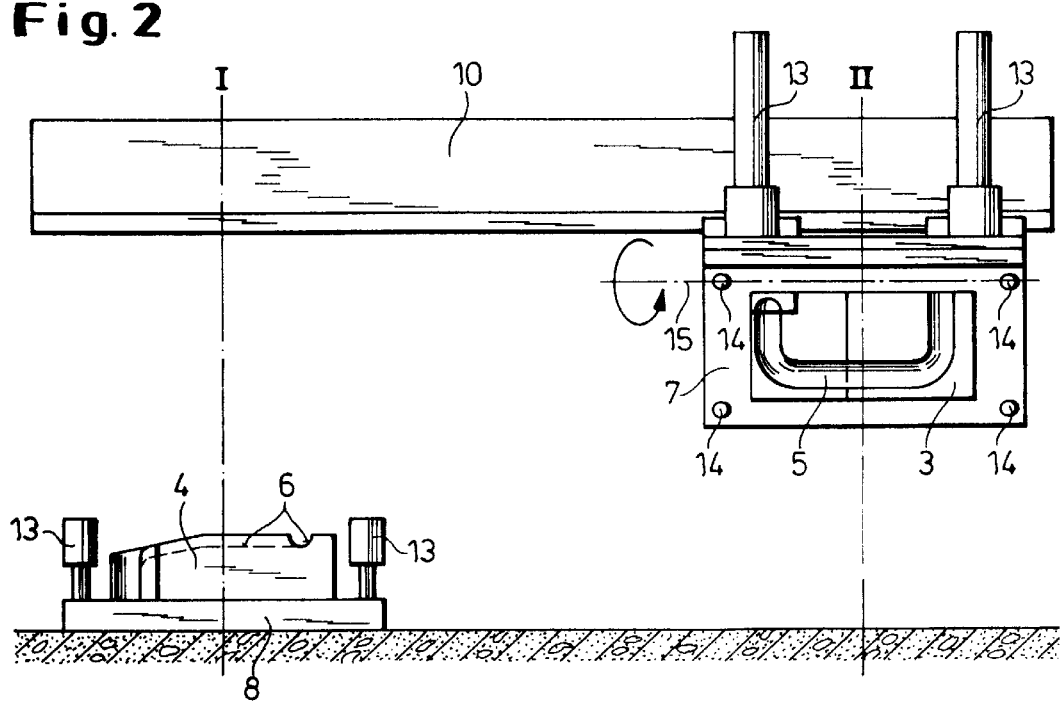
FIG. 2 a schematic view of the blow molding machine shown in FIG. 1, with the upper half-mold being displaced to a further station and pivoted in a vertical plane by 90°.

FIG. 2 shows a position in which the upper half-mold 3 has been displaced from the blow station I into the blow station ii and pivoted there about a horizontal axis 15. In this position, the cavity 5 of the upper half-mold 3 is accessible for placing, e.g., clips or the like manually, by a robot, or by any other feeding system. As soon as placing of corresponding elements takes place, the half-mold 3 is returned to the blow station I, is pivoted into its original position, and is lowered down. The two half-molds 3, 4 are then locked in their closed position with cylinders 13. This displacement of the upper half-mold 3 permits to develop a simple manufacturing concept, in particular when more than one horizontally displaceable upper half-molds are associated with a single lower half-mold. In this case, the lower half-mold can be covered by a respective upper half-mold displaced into the operational position of the mold.

Figure 3:
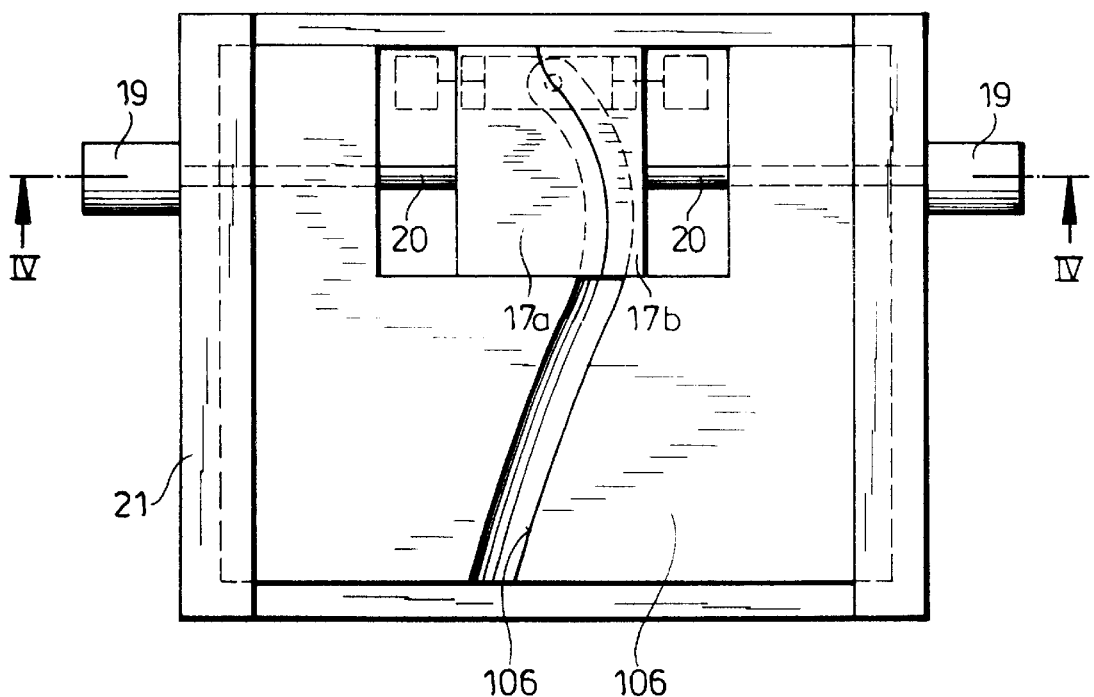
FIG. 3 a plan view of another embodiment of the lower half-mold in the region of critical radii of the cavity of which, slides are provided.
Figure 4:
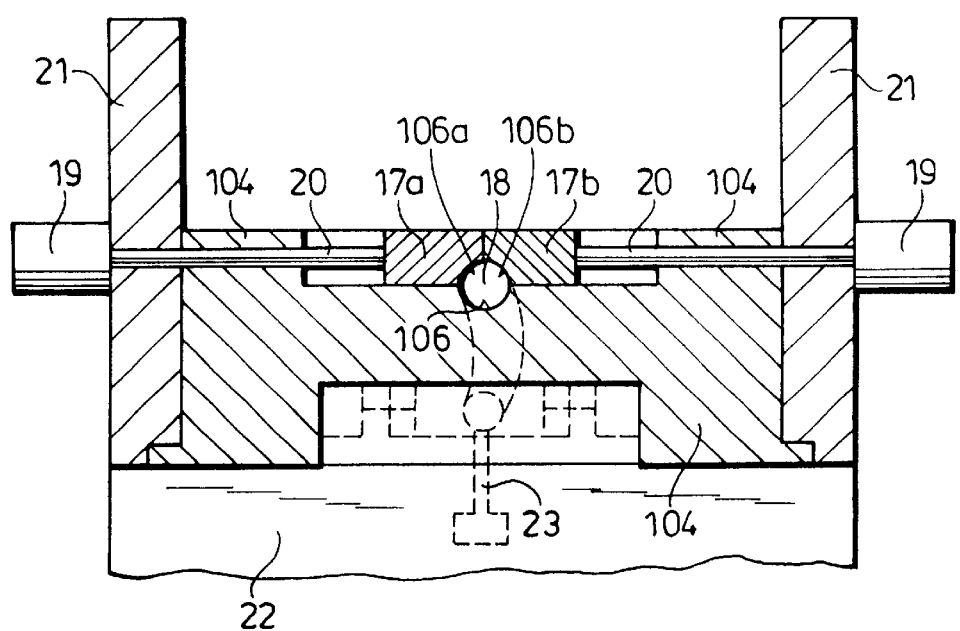
FIG. 4 a cross-sectional view along line IV—IV in FIG. 3.

FIGS. 3 and 4 show another embodiment of the lower half mold 104 with a cavity 106. In this embodiment of the lower half-mold 104, two opposite slides 17a, 17b are provided in the region of a small radius of the cavity 106 for finishing the formation of the article cavity 18 (see FIG. 4). At that, the slide-free region of the cavity 5 of the upper half-mold 3 is appropriately shaped and formlockingly engages the slides 17a and 17b, being formed as a single chamber recess. For completing the article cavity 18, the two slides 17a, 17b have respective partial profiles 106a, 106b which correspond to one fourth of the circle of the article cavity 18. For positioning of the slides 17a, 17b, there are provided two hydraulic cylinders 19 which are connected with respective slides 17a, 17b with respective piston rods 20 and drive the slides 17a, 17b in opposite direction. The cylinders 19 are arranged in openings formed in crossbars 21 of the machine frame 22 and are adjustable in X-Y direction. The position of the cylinders 19 is adjusted dependent on the mold design.

After the preform hose has been placed in the cavity 106 of the lower half-mold 104, the slides 17a, 17b are displaced into their closed position shown in FIGS. 3 and 4 and prevent the preform hose from jumping out of the narrow radius region of the cavity 106. As soon as the slides, the number of which depends on the number of narrow radii in the cavity 106, become closed, the upper half-mold is lowered down, and the locking system 13, 14 is actuated. Thereafter, the preform hose, which is closed in the cavity 106 over its entire circumference, is blown up into a finished article by injection through an integrated blow mandrel or needle 23.

Though the present invention has been shown and described with reference to a preferred embodiment, such is merely illustrative of the present invention and is not to be construed as a limitation thereof, and the present invention includes all modifications, variations and/or alternate embodiments within the spirit and scope of the present invention as defined by the appended claims.

What is claimed is:

1. A blow molding machine for producing three-dimensional low-waste articles, comprising at least one horizontally separated blow mold formed of upper and lower half-molds; means for vertically displacing at least one of the upper and lower half-molds between an open mold position in which the upper half-mold is spaced from the lower-half mold, and a closed mold position in which the upper and lower half-molds engage each other; means for locking the upper and lower half-molds in the closed position thereof; and means for effecting at least one of pivoting the upper half-mold in the open mold position about a horizontal axis by substantially 90° and displacing the upper half-mold linearly in a horizontal plane, wherein the effecting means comprises a carriage in which the upper half-mold is arranged, and wherein the vertically displacing means comprises a lifting device provided on the carriage for vertically displacing the upper half-mold toward and away from the lower half-mold.

2. A blow molding machine for producing three-dimensional low-waste articles, comprising at least one horizontally separated blow mold formed of upper and lower half-molds; means for vertically displacing at least one of the upper and lower half-molds between an open mold position in which the upper half-mold is spaced from the lower-half mold, and a closed mold position in which the upper and lower half-molds engage each other; means for locking the upper and lower half-molds in the closed position thereof; means for effecting at least one of pivoting the upper half-mold in the open mold position about a horizontal axis by substantially 90° and displacing the upper half-mold linearly in a horizontal plane; oppositely arranged slides provided in each region of a cavity of the lower half-mold with a narrow radius, and means for displacing the oppositely arranged slides toward and away from each other.

3. A blow molding machine as set forth in claim 1, wherein the effecting means comprises a device for pivoting the upper half-mold.

4. A blow molding machine as set forth in claim 1, wherein the locking means comprises locking cylinder means provided on the lower half-mold and mating lockbar means provided on the upper half-mold.

5. A blow molding machine as set forth in claim 1, wherein the lower half-mold comprises means for injecting tempered air into a mold cavity.

6. A blow molding machine as set forth in claim 1, further comprising a plurality of horizontally displaceable upper half-molds associated with the lower half-molds.

\* \* \* \* \*